United States Patent [19]

Pepe

[11] Patent Number: 4,792,100
[45] Date of Patent: Dec. 20, 1988

[54] APPARATUS AND METHOD FOR CONTINUOUS SPOOLING

[75] Inventor: David Pepe, Meriden, Conn.

[73] Assignee: Davis Electric Wallingford Corporation, Wallingford, Conn.

[21] Appl. No.: 145,067

[22] Filed: Jan. 19, 1988

[51] Int. Cl.$^4$ .......................................... B65H 67/052
[52] U.S. Cl. .................................................. 242/25 A
[58] Field of Search .............. 242/25 A, 25 R, 18 A, 242/18 R, 18 DD, 47, 35.5 R, 56 R, 56 A, 67.1 R; 57/1 R, 354, 356

[56] References Cited

U.S. PATENT DOCUMENTS

| | | | |
|---|---|---|---|
| 3,837,589 | 9/1974 | Johnson et al. | 242/25 A |
| 3,918,650 | 11/1975 | Kemel | 242/25 R |
| 4,377,264 | 3/1983 | Kovaleski et al. | 242/25 R |
| 4,610,404 | 9/1986 | Maccaferri | 242/25 R |
| 4,664,325 | 5/1987 | Pepe | 242/25 A |

*Primary Examiner*—Stanley N. Gilreath
*Attorney, Agent, or Firm*—Pennie & Edmonds

[57] ABSTRACT

A power driven dual shaft, parallel axis take-up apparatus is disclosed having an alternately driven take-up spool mounted on each of the shafts. An outer protective door is provided for each of the spools, each door being pivotally supported for movement between a closed position to provide frontal protection, and an open position to permit access to the respective spool. An inner protective door is pivotally mounted between each outer door and its respective spool for pivotal movement from a first frontal protective position between each spool and the respective outer door and a second protective "slap-guard" position between the spools whereby outer door and inner door protection is provided. The doors are sequentially operative to provide selective access to the spools and protective shielding therebetween. In particular, the inner doors provide simultaneous multi-function action to conveniently cut the elongated flexible stock while simultaneously providing screen door protection between the spools as well as guiding the stock so as to be conveniently snagged for winding onto the empty spool. The respective pairs of doors interlock with each other such that when each outer door is in the open position rotation of the respective inner door to the frontal protective position is prevented by interference with the respective outer door. When each outer door is in the closed position during winding of the respective spool, the inner door prevents opening thereof.

13 Claims, 5 Drawing Sheets

APPARATUS AND METHOD FOR CONTINUOUS SPOOLING

TECHNICAL FIELD

This invention relates generally to an apparatus for spooling flexible stock, i.e. cable, consolidated wire, etc., on alternately rotating adjacent spools at high speeds. In particular, the apparatus includes important sequencing and multiple function safety features. A method of spooling flexible stock at high speeds is also disclosed.

BACKGROUND ART

The spooling of a predetermined amount of wire or cable onto a take-up spool has in the past been a rather slow and tedious process involving the expenditure time and effort and at considerable expense to the manufacturer or processor of the wire or cable. In addition, protection of the operator and surrounding equipment has generally been accomplished successfully with separate individual components, each performing independently of the others.

For example, the need is generally provided to wind up a flexible spooling material such as insulated cable or the like onto adjacently positioned spools mounted on parallel shafts for alternate spooling. In general, the spooling operation proceeds on a first rotating spool and is then transferred to a second empty spool during which time the first full spool is replaced with an empty spool so that the process may be repeated. In operating such equipment the speeds are extremely high (normally the stock speed is approximately 1,500 feet per minute) and the close proximity of the spools is such that the spooling operation requires closely spaced and highly sequenced precision equipment to protect the product and the surrounding machinery.

Commonly assigned U.S. Pat. No. 3,837,589 relates to an apparatus and method for continuous spooling in which the apparatus is specially constructed to dependably and reliably insure proper transfer of the stock material from one take-up spool to the other with significant speed and smooth operation.

My commonly assigned U.S. Pat. No. 4,664,325 relates to a guard for power driven spool winder in which a separate guard door is provided for each take-up spool positioned at the front of the housing, the spools being mounted on dual parallel shafts. Heretofore the provision of multi-function guard means which not only provides operator protection in multiple directions but which also functions to maintain a continuous spooling operation has not been known. In particular, the provision of guard means to provide operator and component protection has not normally been made capable to interpose in the sequence of high speed operation to promote smooth continuous spooling of high speed spooling stock with orderly and normal cutting and transfer from the filling spool to the empty spool and back once again to repeat the process.

I have invented an apparatus which includes such guard means whereby the guard means provides dual frontal operator protection and spool-to-spool slapguard and component protection with significant interposing functional components which guide the high speed stock so as to be snagged for filling the empty spool while cutting the high speed stock in simultaneous fashion so as to promote smooth and orderly transfer from the filling spool to the empty spool. In addition, my invention provides unique structural and operative guard members so arranged such that rotation of the outer guard means is prevented by the inner guard means in both the open and closed positions except as provided in the normal sequence of operation. This arrangement significantly provides operator protection when the operator's action is intentional or inadvertent.

SUMMARY OF THE INVENTION

A power driven dual shaft, parallel axis take-up having an alternately driven take-up spool mounted on each of the shafts which comprises an outer protective door for each of the spools, each door being pivotally supported for movement between a closed position to provide frontal protection, and an open position to permit access to the respective spool, and an inner protective door pivotally mounted between each outer door and its respective spool for pivotal movement from a first frontal protective position between each spool and the respective door and a second protective position between the spools, the outer and inner protective doors being sequentially operative to provide selective access to the spools and protective shielding therebetween.

In particular, the invention relates to a protective door guard structure for a take-up apparatus having alternately driven, dual, parallel shafts, a take-up spool mounted on each of the shafts in open proximity to each other and a housing enclosing the take-up apparatus with an opening in the front of the housing providing access to each of the spools for removal and replacement thereof, the door guard structure comprising a separate door guard for each take-up spool positioned at the front of the housing, means for pivotally mounting each door guard for movement between a first closed position covering the portion of the opening in the housing in front of its respective spool and a second open position, and an inner protective door pivotally mounted adjacent each spool for movement between a first protective position between the spools and a second frontal position between the respective door guard and the spool when the door guard is in the closed position.

In its preferred form, the apparatus which I have invented for continuously spooling flexible spooling stock material comprises a housing having an opening in the front portion, a pair of rotatable spindles accessible from the opening and disposed in spaced apart, parallel relation for mounting take-up spools, each of the spindles having a flange mounted for rotation therewith at the inner end, snagging means mounted on the flange of each spindle and defining with the flange a generally tapered stock-receiving groove operable to receive and anchor stock by wedging action, a stock carriage guide mounted for movement laterally of the take-up spools between a wind-on position for one take-up spool and a cross-over position for the other take-up spool at which latter position the stock is transferred to the other take-up spool for spooling thereon, means to operatively rotate each spindle to spool the stock from the carriage to the respective spool, an outer protective door for each of the spools, each door being pivotally supported for movement between a closed position to provide frontal protection, and an open position to permit access to the spool, and an inner protective door pivotally mounted between each outer door and its respective spool for pivotal movement from a first protective position between each spool and the respective door and a second protective position between the spools, the outer and inner protective doors being sequentially operative to provide selective access to the spools and protective shielding therebetween.

The apparatus according to the invention further comprises means associated with the respective inner and outer doors to prevent opening each outer door when the respective inner door is in the frontal position and means to prevent rotation of each inner door to the frontal protective position when the respective outer door is in the open position. Further, the carriage is conveniently arranged to cross-over from a position adjacent a filling spool to a position adjacent the empty spool in timed sequence to permit the empty spool to accelerate up to speed prior to snagging the stock for filling the empty spool. Each inner protective door is preferably arcuately configured.

Each inner protective door is preferably arranged to pivotally rotate from the frontal protective position to the protective position between the spools prior to completion of filling of the respective spool with stock. The rotation of the inner protective door permits opening of the outer protective door. Each inner protective door preferably comprises means to engage the flexible stock to move the stock toward the snagging means associated with the empty spool. Further, each inner protective door preferably comprises knife means adjacent the stock engaging means, the knife means being positioned and arranged to cut the flexible stock by the snagging action of the snagging mean associated with the empty spool which causes engagement of the stock with the cutting portion of the knife means. An upright stationary guide member is preferably positioned between the spools and arranged to engage and guide the flexible stock when engaged by the engaging means associated with the inner protective doors. Each inner door is preferably constructed of protective screen material.

Each outer door is preferably constructed at least in part of a transparent protective material to facilitate visual observation of the respective spool therebehind while providing operator protection.

A method is also disclosed for spooling a flexible spooling stock on alternately driven take-up spools respectively mounted on adjacent dual parallel axis shafts comprising directing the spooling stock onto a first rotating spool through guide means positioned adjacent the first spool, pivotally shifting the position of the guide means to a position adjacent the empty spool while continually feeding stock to the filling spool, interposing inner protective barrier means between the spools while substantially simultaneously cutting the stock and causing the stock to become snagged for winding on the empty spool, repositioning the protective means to a frontal protective position in front of the filling spool, and providing outer operator protective means arranged to pivot to and from a frontal protective position in front of the first mentioned inner protective barrier means.

BRIEF DESCRIPTION OF THE DRAWINGS

Preferred embodiments of the invention will be described herein below with reference to the drawings wherein.

DETAILED DESCRIPTION OF THE PREFERRED EMBODIMENTS

In the description which follows where similar components are provided on both the left hand and the right hand portions of the apparatus, reference is made to both numerals, where appropriate.

Figure 1:
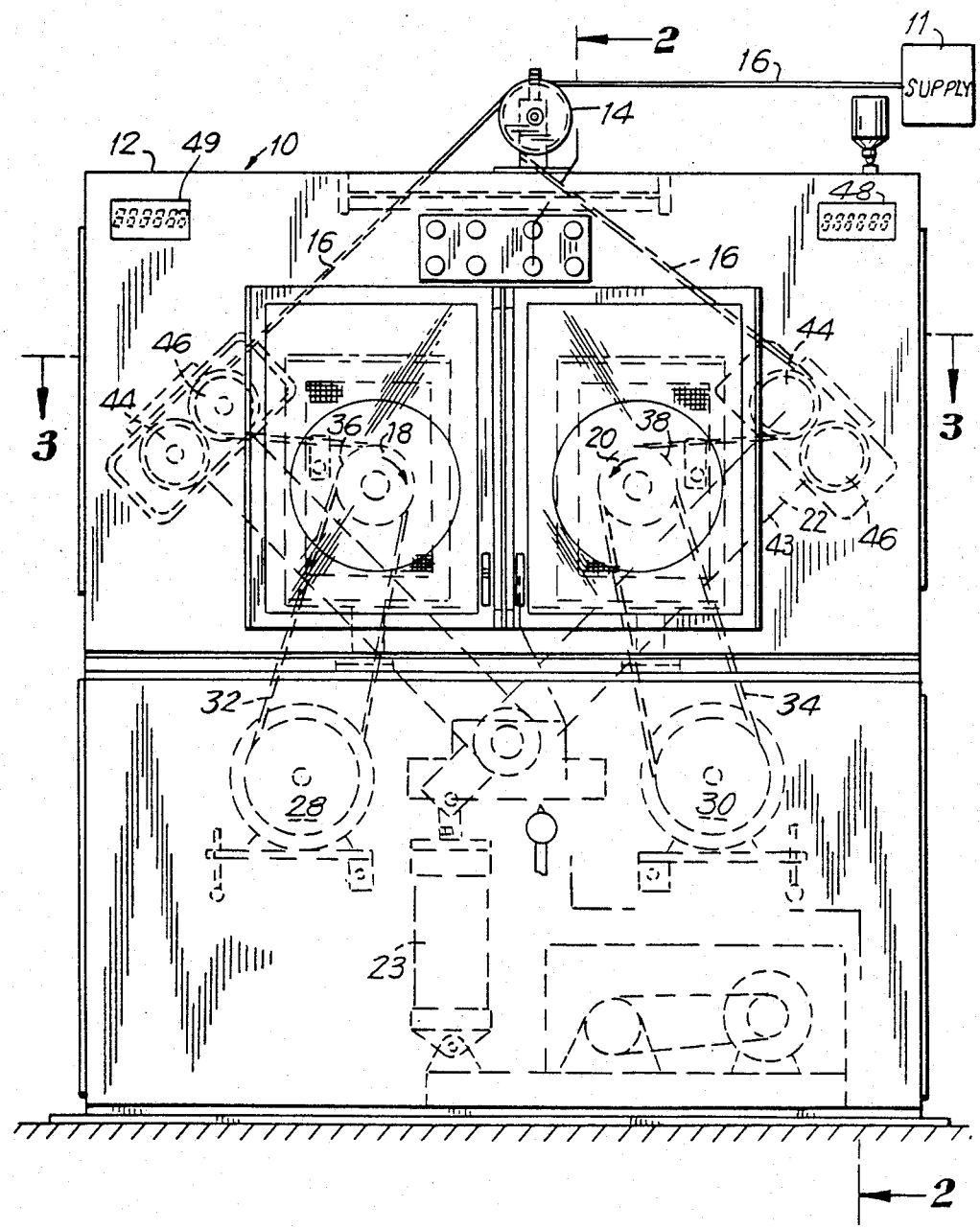
FIG. 1 is a front elevational view of the winding apparatus of the present invention.
Figure 2:
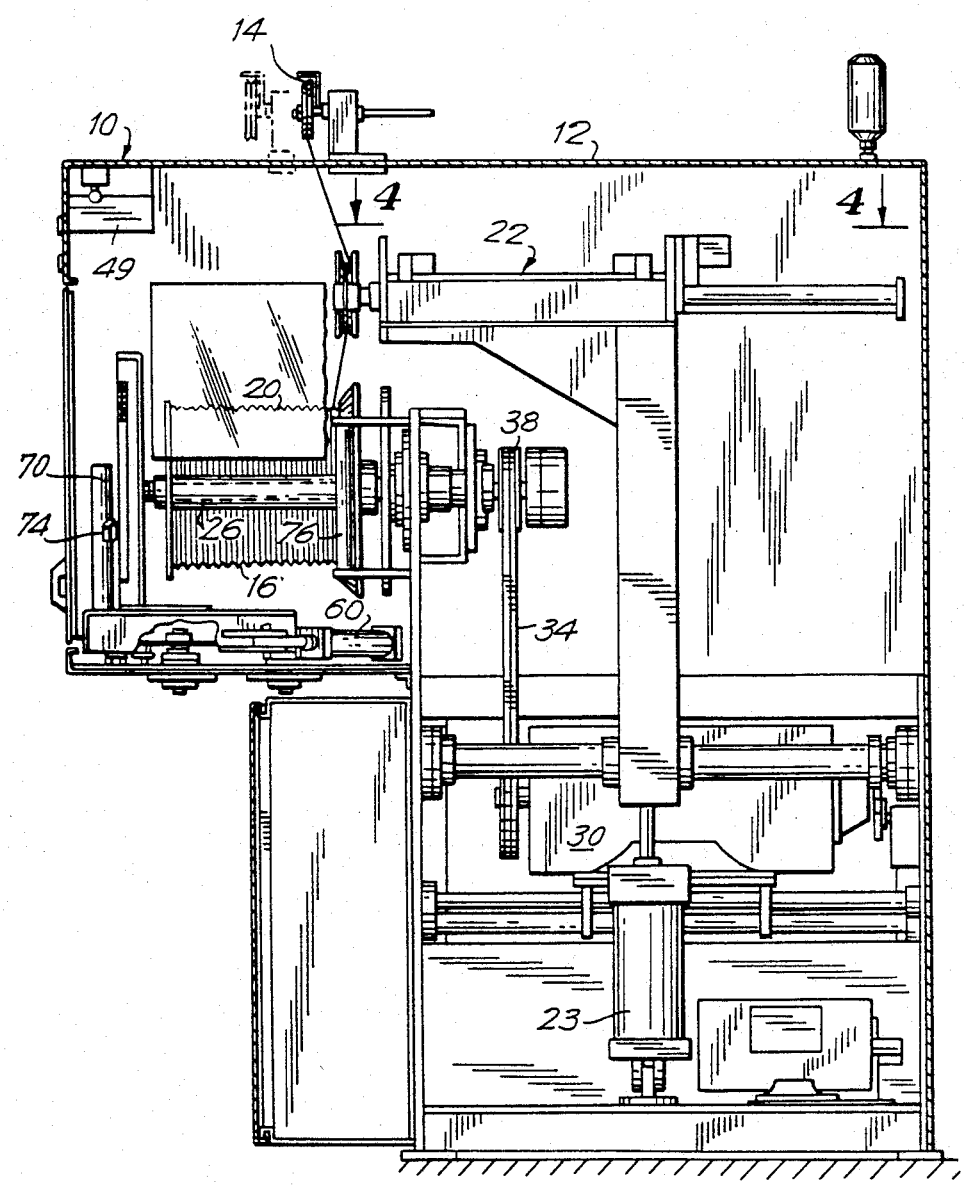
FIG. 2 is a view taken along lines 2—2 of FIG. 1.

Referring to FIG. 1, the apparatus 10 constructed according to the present invention is illustrated. The apparatus 10 includes frame 12 with appropriate pulley 14 positioned to guide a continuous spooling flexible stock 16 material from a suitable source of supply (shown schematically at 11). The flexible spooling stock 16 can be of any type of stock such as insulated electrical stock material having an electrically conductive core and an outer non-conductive insulation, or other wire or cable which is intended for winding about suitably sized spools for convenient storage, sale or distribution in pre-determined amounts. For purposes of the present description, I refer to the flexible spooling stock as "cable 16". The spools to which I refer are shown most clearly at 18 and 20 of FIGS. 1 and 6 and are arranged to receive portions of the cable in an alternating fashion as will be described hereinbelow.

Referring once again to FIG. 1, a traverse guide (or cable carriage) 22 is shown in dotted lines in both positions which it normally assumes during operation. The traverse guide includes guide pulleys 44, 46 supported by tubular support 43. When the traverse guide 22 is tilted to the left as shown in FIG. 1, the supply of cable 16 is directed onto left spool 18 while simultaneously traversing the width of the spool (i.e. into and out of the plane of the drawing of FIG. 1), whereas the right-sided tilted position of the traverse guide is intended to direct cable 16 onto right spool 20 as shown. Thus, during the operation, when cable is to be wound onto the spool 20, the traverse guide assumes the position shown tilted to the right half of FIG. 1. When spool 20 is partially wound with a predetermined amount of cable, the traverse guide is automatically shifted to the opposite position while festooning the moving wire to a path tangent to the bottom of the winding spool 20, while being positioned above the barrel of the empty spool 18. The winding operation continues from the new location until a predetermined additional amount of cable fills the spool 20, after which the cable is automatically cut as will be described below. Once the cable is cut, the winding operation onto spool 18 is automatically initiated as will also be described.

Figure 3:
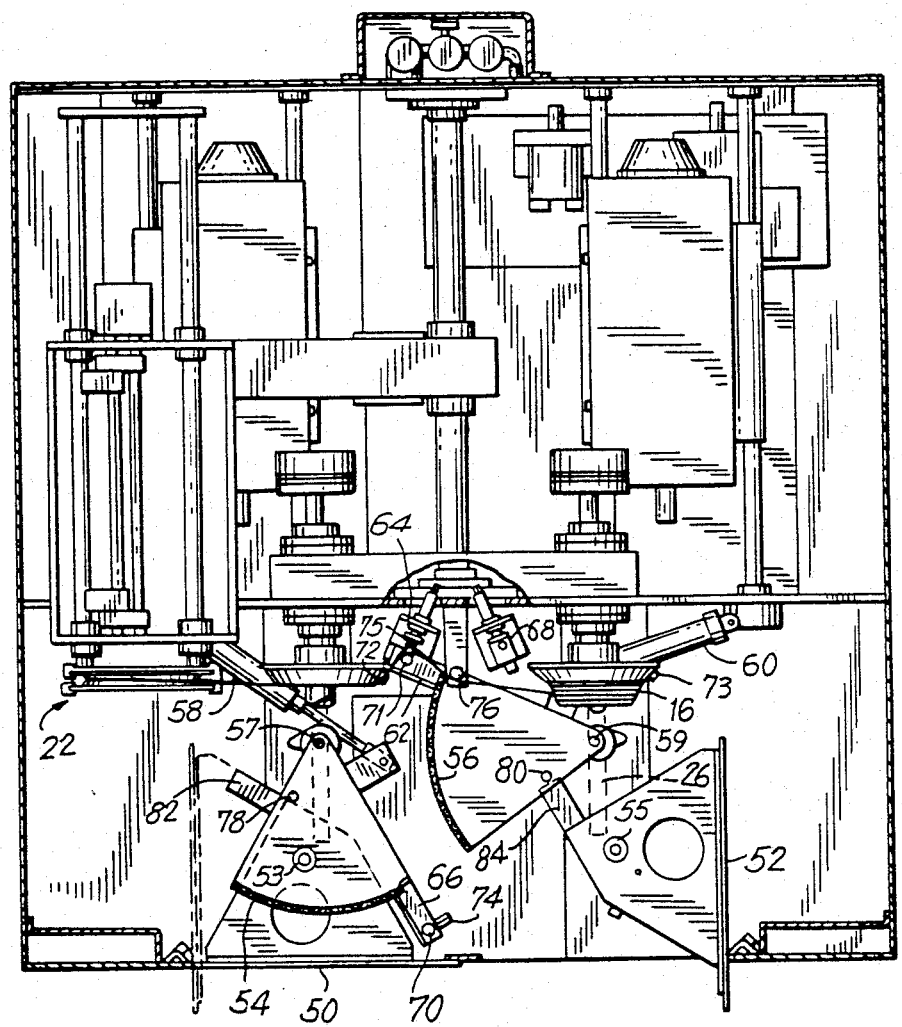
FIG. 3 is a view taken along lines 3—3 of FIG. 1.
Figure 4:
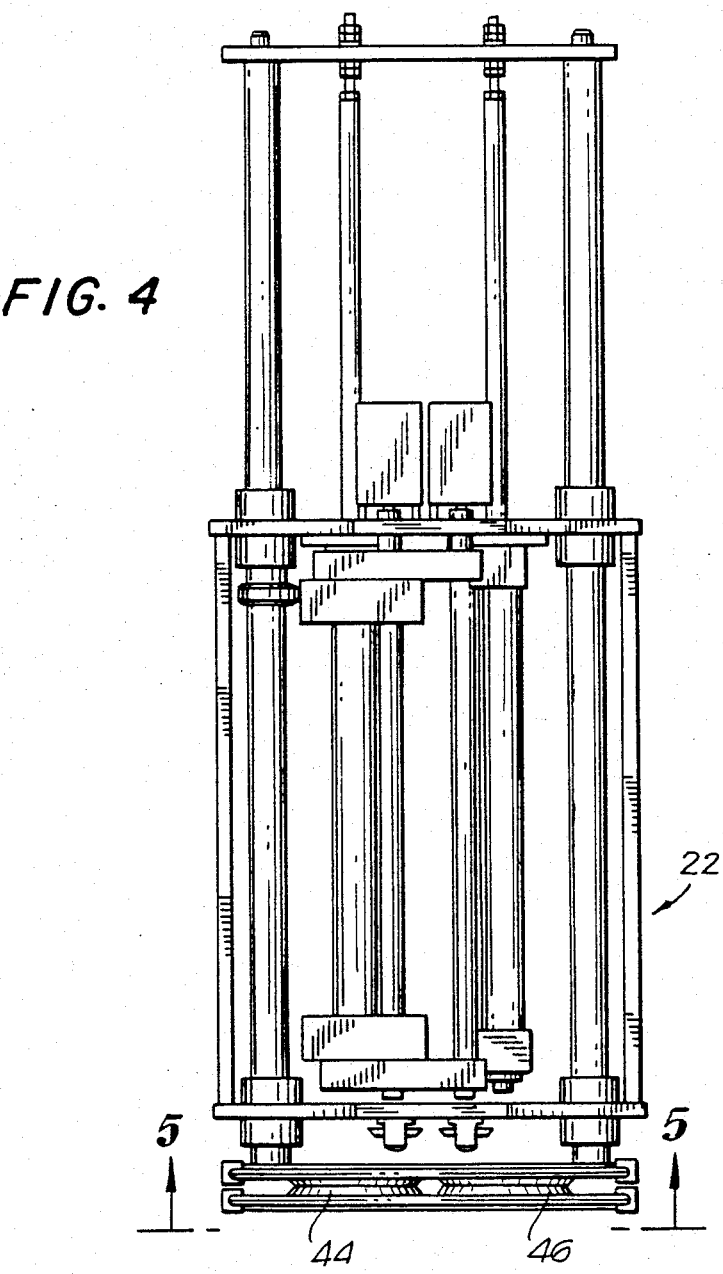
FIG. 4 is a view of the traverse guide taken along lines 4—4 of FIG. 2.
Figure 5:
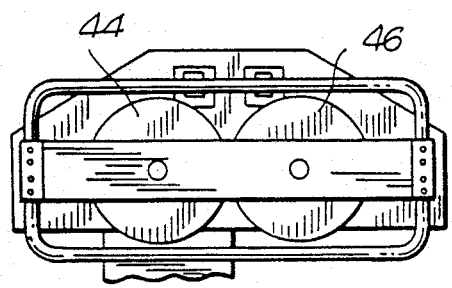
FIG. 5 is a view taken along lines 5—5 of FIG. 4.
Figure 6:
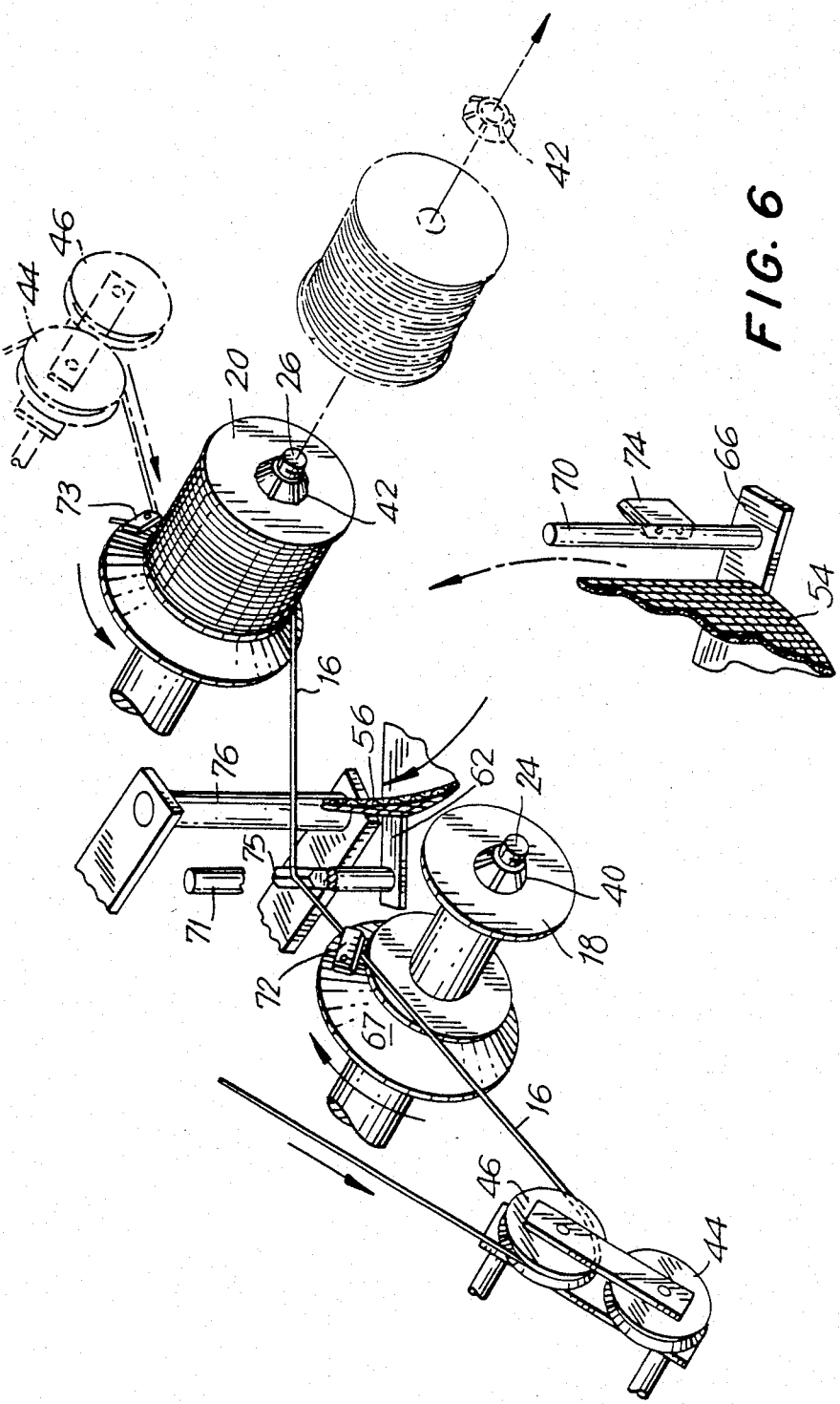
FIG. 6 is a perspective view of the take-up spools of the present invention immediately prior to cutting the flexible stock material for transfer from the full spool to the empty spool.

Referring once again to FIG. 1, in conjunction with FIGS. 3 and 6, the spools which are intended to receive the cable are respectively positioned about parallel axis shafts 24 and 26 conveniently positioned such that a spool fixed for rotation with each shaft will be within the direct line of feed of the flexible cable 16 as it is taken off the appropriate pulley (44, 46) of traverse guide 22 as shown. Each parallel axis shaft is driven by a suitable mechanism including motor drives 28 and 30 and associated belt drives 32 and 34 which in turn drive a suitable pulley 36 and 38 respectively fixed to rotatably drive each parallel axis shaft 24 and 26. The traverse guide 22 and related mechanism is similarly operated in known manner. The spools, which are more particularly shown in FIG. 6 at 18 and 20 are standard wire or cable spools which can be slid in position onto the appropriate parallel axis shaft 24 or 26 where it is keyed for rotation with the respective shaft. Thereafter, a suitable collar lock shown at 40 and 42 in FIG. 6 is positioned to firmly secure the spool on the shaft for rotation therewith. Snagger discs 67, 69 are fixed to rotate with shafts 24, 26 and mount appropriate cable snagger hooks 72, 73.

In general, the spooling operation functions as follows. When the traverse guide is tilted toward the left side of FIG. 1 by action of pneumatic cylinder 23, the cable 16 passes over pulley 14 and around pulley 46 so as to enter the entry port to spool 18. When the traverse guide shifts from a tilt position at the left side of FIG. 1 to the tilt position at the right side of FIG. 1, also by action of cylinder 23 and related connecting hardware, the cable supply changes direction about spool 14 and enters the entry port of the spools about pulley 44 as shown in dotted lines. In this instance, the cable 16 changes direction about pulley 44 and after spool 18 is full, the cable is fed onto wind-up spool 20 which is now rotating in a counterclockwise direction as viewed in FIG. 1. After partially filling the spool 20 with a predetermined amount (i.e. about 350 feet for a 500 foot spool) of cable, as measure by the footage counter 48 shown in FIG. 1, the traverse guide is rotated from the position of tilt to the right of FIG. 1 over to the left tilt position (i.e. the left of FIG. 1) so as to prepare it for cut-over to the empty spool 18. At this point, the feed direction for the remaining cable onto spool 20 is from a tangent point at the bottom of the spool 20 and is fed off pulley 46, after passing over the top of (or touching) the empty spool 18. Simultaneously, with the repositioning of the traverse guide 22, empty spool 18 starts rotating and accelerating so that when spool 20 is full (i.e. about 500 feet of stock is wound as measured by the counter 48) the peripheral speed of the core or barrel of spool 18 equals the line speed and is thus ready to "accept" the cable for winding thereon by snagging it to begin the winding process. Thus, when the desire predetermined footage has been wound about the filling spool, the counter (and appropriate circuitry) overrides the traverse motion and shifts the traverse guide 22 to reset to the inner spool flange. The traverse guide momentarily stops traversing the filling spool at the inside location to maintain the cable at the inside end of the spool, adjacent the inner flange so that it is in position to be snagged and cut as will be described.

Inner arcuate screen guards 54, 56 are positioned for pivotal motion as shown. Their frames have attached thereto fingers 70, 71 which respectively push the cable into the path of the appropriate rotating empty spool snagger hook 72, 73 when the screen guards are rotated to the location intermediate the spools as shown in FIG. 6. At the same time, the cable is moved into engagement with stationary finger 76 positioned midway between the spools and is caught and cut by the knife 74, 75 located adjacent the finger 70, 71, while the rotation of the snagger hook 72,73 forces it downwardly against the sharp edge of the knife 74, 75. The empty spool 18 now begins filling, and the full spool is braked to a halt. While decelerating, the full spool has a loose end, which has just been cut and this loose end would normally tend to slap against the now filling spool 18 on occasion causing damage to it. Further, this loose end can be caught in the winding spool thereby leading to disruption of the winding process and necessitating shut down of the line.

All of this disruption is avoided by the existence of the arcuate protective screens 54, 56 positioned which alternately position themselves midway between the spools. The transfer of the cable feed is made by the combination of the pivotally swinging the traverse guide from the spool-filling tilted position over to the empty spool tilted position (both shown in FIG. 1) and thereafter by cutting the cable. In this instance, the same feed cable is now snagged onto the empty spool for winding thereon. Since the empty spool begins accelerating approximately when the traverse guide shifts position, at the time the cable is snagged by the snagger hook, the peripheral speed of the spool is approximately equal to the cable speed thus providing a smooth transition. During the time that the winding procedure of each respective spool is taking place, the operator may remove the full spool and replace it with the next empty spool for refilling.

It will be readily appreciated that the close proximity of the parallel axis shafts, combined with the relatively closer proximity of the spools 18, 20 as well as the relatively high linear speed of the cable 16 (i.e. in the order of 1,500 feet per minute) being wound therearound present a substantially dangerous and potentially hazardous situation for the operator. In particular, it will be appreciated that this high-speed operation requires cutting of the cable at the end of each cycle and start-up of the spooling operation at the beginning of each cycle at times during which the operator is conducting a spool change-over from a full spool to an empty spool. In this respect, the potential danger begins with the possibility that cutting the cable being fed onto one spool or the other could present a serious safety problem due to the intensive repetitive slapping of the end of the cable in the vicinity where the operator is changing spools. This potential danger to product and surrounding equipment is readily eliminated in an improved manner by the present invention as will be described hereinbelow.

The apparatus of the present invention as viewed from the front, includes two protective outer doors, a left door 50 and a right door 52 shown in the open position in FIG. 3. Each door is associated with the respective spool positioned therebehind. For example, left hand outer protective door 50—which pivots at 53—is associated with spool 18 and right hand outer protective door 52—which pivots at 55—is associated with spool 20 positioned therebehind. Positioned within the work area of the apparatus are inner arcuate shaped protective screen doors 54 and 56 which are pivotally rotatable about pivots 57 and 59 and are sequentially operatively rotated by pneumatic cylinders 58 and 60 to and from the two positions shown in FIG. 3. For example, the position on the left side of FIG. 3 is that of the inner protective door 54 during the period of winding of flexible cable onto spool 18, while the position of inner door 56 shown on the right side of the work area in FIG. 3 is the position of inner door 56 which protects the operator's hands from the high-speed stock being wound about spool 18 while the full spool 20 is being removed. In the opposite filling mode the positions of all doors shown are revised.

The spooling of cable commences about spool 20 when left-side spool 18 is full, and the cable is snagged by snagger hook 73. When right inner door 56 is pneumatically rotated to the position shown in FIG. 3 by extension of pneumatic cylinder 60, an extension of the frame of the inner door shown at 62 engages shock absorber 64 in the same fashion as extension portion 66 of left door 54 engages shock absorber 68 when left door is rotated to the protective position between the spools.

In FIG. 3, left door 54 is shown in the normal operative protective position and right door 56 is shown in the "slap guard" position. When each outer door 50, 52 is in the closed position as door 50 is shown in FIG. 3, the inner door 54, 56 is rotated to the frontal position immediately behind the outer door 50, 52 and thus the two doors provide double protection between the rotating spool and the operator who is normally standing immediately outside and in front of the two doors 50, 52. Moreover, the frame of inner doors 54, 56 each contain a downwardly extending pin 78, 80 which is positioned such that rotation of outer doors 50, 52 is prevented when door 50, 52 is closed and the inner door 54 is in the frontal position. For the left doors, the pin 78 on the frame of inner door 54 actually interferes with the structure of outer door 50 (shown in dotted lines in FIG. 3) to prevent the door 50 from opening.

When the operation sequence causes inner door 54 to be rotated to the corresponding position in which right inner door 56 is shown, only then is the interference relation between the pin 78 of inner door 54 and outer door 50 removed, thus permitting rotation of outer door 50. The actual framework of outer door 50 which interferes with pin 78 is shown in dotted lines in FIG. 3 because it is positioned below inner door 54. The same protective mechanism is provided for the right inner door 56 and the right outer door 52.

It can be appreciated that in the sequence of the operation the rotation of inner door 54 to the "slap guard" position (as shown for the right inner door 56 in FIG. 3) is accomplished by shortening of pneumatic cylinder 58. The interference relation between pin 78 and the frame of outer door 50 is removed by the arcuate movement of pin 78 out of the area of the door frame, thus permitting outer door 50 to be opened manually so as to provide access to the spool by the operator. Similarly, when the inner door 54 is in the "slap guard" position and the outer door is opened, a new interference relation arises between pin 78 and the end portion of frame extension 82 as shown with respect to extension 84 of right outer door 52 and right inner door 56 in FIG. 3. The interference relation arises out of the relative positions of frame extensions 82, 84 and pins 78, 80 which are shown in FIG. 3. As a result of the interference relation arising out of the relative positions of frame extensions 82, 84 and pins 78, 80, rotation of inner door 54, 56 is precluded until respective outer door 50, 52 is rotated back to the frontal protective position by the operator. The manual pivotal motion of the outer door is thus permitted by the geometry of the normally interfacing components so that the path of the frame extensions 82, 84 moves out of interference with respective pin 78, 80 on inner door 54, 56.

In fact the closing motion of outer door 50, 52 activates a micro-switch (not shown) which controls the appropriate pneumatic cylinder to automatically activate the inner door 54, 56 to the frontal protective position.

The sequence of operation and function of the inner and outer doors of the apparatus will now be described. As noted above, the traverse guard 22 which is in position to feed one of the spools in the normal fashion (i.e. from the top as shown in FIG. 1) remains in this position until a predetermined amount of cable is uniformly wound around the spool being filled by back and forth motion of the traverse guard across the width of the face of the spool. When this predetermined footage is reached as measured by counter 48, the traverse guard 22 swings over to the opposite tilt position and continues to feed the same spool; however, the feeding of that spool is now accomplished from a direction extending over the empty spool and underneath the filling spool. At this point of transfer of the traverse guard, the empty spool begins accelerating so that at the point at which the filling spool is full, the peripheral speed of the empty spool is approximately equal to the speed of the cable.

When the spool is full, (i.e. for a 500 foot spool, 500 feet of cable has been wound), a micro-switch transmits a signal to the appropriate pneumatic cylinder (58, 60) which pivotally rotates the appropriate inner door to the "slap guard" position (i.e. between the spools). During this rotation, the appropriate finger 70, 71 attached to the rotating inner door engages the cable and shifts it toward stationary finger 76 placing it in the path of the appropriate snagger hook 72, 73 which is associated with the empty spool as shown in FIG. 6. The snagger hook in turn is rotating with the empty spool and pulls the cable 16 downwardly onto knife 74, 75 which is formed adjacent the finger 70, 71 causing the substantially simultaneous steps of cutting the cable and hooking it onto the empty spool. At this precise time, the free end of the cable on the full spool assumes a certain amount of slapping action against the inner slap guard door and the empty spool begins the filling operation smoothly due to the fact that the peripheral speed of the empty spool is approximately equal to the linear speed of the cable.

With the appropriate slap guard door in the "slap guard" position, the interference relation between the pin 78, 80 and the frame portion of the outer door 50, 52 has now been removed and the operator is free to open the outer door to remove the full spool and to replace it with an empty spool onto the same shaft. When the empty spool is placed on the appropriate shaft, the operator closes the outer door 50, 52 which is positioned and dimensioned to activate a micro-switch which controls the appropriate pneumatic cylinder 58, 60, which in turn actuates the inner door to the frontal position by rotating it 90 degrees from its existing "slap guard" position. The filling operation on the working spool continues until the switch-over to the empty spool is accomplished in the same fashion as described, whereby the operator again manually accomplishes the changing of the spools also as described.

As noted, the sequence of spooling cable from one spool to the other and the change-over from the filling spool to the empty spool is precisely and sequentially controlled automatically by known electrical circuitry and micro-switches and by counters 48, 49 which automatically count the length of the cable wound about the spool. This length is normally indicated by the counter 48 shown in the upper right hand corner of the apparatus in FIG. 1. Counter 49 is provided to control the precise cable footage wound about the spools by providing appropriate signals to compensate for the inertia and speed of the moving components.

It can be seen that the present invention incorporates a number of unique advantages into such spooling apparatus of the type described. In particular, it should be noted that several operator protector doors are provided, one being an outer protective door and the other being an inner slap guard door which protects the operator as well as the filling spool from damage which would otherwise be provided by the free end of the cable of the full spool which continues to rotate as it decelerates to a halt position after completion of the filling operation. A sequential operation is provided which includes a moving finger and a stationary finger to guide the cable to the appropriate location in which the operative sequence can proceed from the filling spool to the empty spool. The moving finger includes a knife which moves into the path of the cable to conveniently cut the cable at the appropriate time and location while the vertical stationary finger maintains the path of the cable in a predetermined fashion.

A convenient and ultra-safe interlock is thus provided between the inner and outer doors so as to prevent the operator from knowingly or inadvertently opening either of the outer doors during the filling operation of the spool located behind the particular outer door. This advantageous arrangement is provided by an interference or interlocking relation between the prespective frame work of the inner and outer doors and is electronically and mechanically controlled within the sequence of the entire operation. Accordingly, it can be seen that the operation of the apparatus which I have invented is sequential, precise and convenient while providing the ultimate degree of protection for the operator who is required at all times to periodically enter into the work area to remove a full spool and replace it with an empty spool. The necessity of such operator manipulation is absolute and is now totally protected by my apparatus.

I claim:

1. A power driven dual shaft, parallel axis take-up having an alternately driven take-up spool mounted on each of said shafts which comprises:
   (a) an outer protective door for each of said spools, each said door being pivotally supported for movement between a closed position to provide frontal protection, and an open position to permit access to the respective spool; and
   (b) an inner protective door pivotally mounted between each outer door and its respective spool for pivotal movement from a first frontal protective position between each spool and the respective door and a second protective position between said spools, said outer and inner protective doors being sequentially operative to provide selective access to the spools and protective shielding therebetween.

2. A protective door guard structure for a take-up apparatus having alternately driven, dual, parallel shafts, a take-up spool mounted on each of said shafts in open proximity to each other and a housing enclosing the take-up apparatus with an opening in the front of the housing providing access to each of said spools for removal and replacement thereof, said door guard structure comprising:
   (a) a separate door guard for each take-up spool positioned at the front of the housing;
   (b) means for pivotally mounting each door guard for movement between a first closed position covering the portion of the opening in the housing in front of its respective spool and a second open position; and
   (c) an inner protective door pivotally mounted adjacent each spool for movement between a first protective position between the spools and second frontal position between the respective door guard and said spool when the door guard is in the closed position.

3. An apparatus for continuously spooling flexible spooling stock material which comprises:
   (a) a housing having an opening in the front portion;
   (b) a pair of rotatable spindles accessible from said opening and disposed in spaced apart, parallel relation for mounting take-up spools, each of said spindles having a flange mounted for rotation therewith at the inner end;
   (c) snagging means mounted on said flange of each spindle and defining with said flange a generally tapered stock-receiving groove operable to receive and anchor stock by wedging action;
   (d) a stock carriage guide mounted for movement laterally of the take-up spools between a wind-on position for one take-up spool and a cross-over position for the other take-up spool at which latter position the stock is transferred to the other take-up spool for spooling thereon;
   (e) means to operatively rotate each spindle to spool the stock from said carriage to the respective spool;
   (f) an outer protective door for each of said spools, each door being pivotally supported for movement between a closed position to provide frontal protection, and an open position to permit access to the spool; and
   (g) an inner protective door pivotally mounted between each outer door and its respective spool for pivotal movement from a first protective position between each spool and the respective door and a second protective position between said spools, said outer and inner protective doors being sequentially operative to provide selective access to the spools and protective shielding therebetween.

4. The apparatus according to claim 3 further comprising means associated with the respective inner and outer doors to prevent opening each outer door when the respective inner door is in the frontal position and means to respectively prevent rotation of each inner door to the frontal protective position when the respective outer door is in the open position.

5. The apparatus according to claim 4, wherein said carriage is arranged to cross-over from a position adjacent a filling spool to a position adjacent the empty spool in timed sequence to permit said empty spool to accelerate up to speed prior to snagging the stock for filling the empty spool.

6. The apparatus according to claim 5 wherein each inner protective door is arcuately configured.

7. The apparatus according to claim 6 wherein each inner protective door is arranged to pivotably rotate from the frontal protective position to the protective position between the spools prior to completion of filling of the respective spool with stock, said rotation of said inner protective door thereby permitting opening of said outer protective door.

8. The apparatus according to claim 7 wherein each inner protective door comprises means to engage the flexible stock to move the stock toward said snagging means associated with the empty spool.

9. The apparatus according to claim 8 wherein each inner protective door comprises knife means adjacent said stock engaging means, said knife means being positioned and arranged to cut the flexible stock by the snagging action of said snagging means associated with the empty spool which causes engagement of the stock with the cutting portion of said knife means.

10. The apparatus according to claim 9 further comprising an upright stationary guide member positioned between said spools and arranged to engage and guide the flexible stock when engaged by said engaging means associated with said inner protective doors.

11. The apparatus according to claim 10, wherein each said inner door is constructed of protective screen material.

12. The apparatus according to claim 10 wherein each said outer door is constructed at least in part of a transparent material to facilitate visual observation of the respective spool therebehind.

13. A method of spooling a flexible spooling stock on alternately driven take-up spools respectively mounted on adjacent dual parallel axis shafts comprising:

(a) directing the spooling stock onto a first rotating spool through guide means positioned adjacent said first spool;

(b) pivotally shifting the position of said guide means to a position adjacent a second empty spool while continually feeding stock to said first spool;

(c) interposing inner protective barrier means between said spools while substantially simultaneously cutting the stock and causing the stock to become snagged for winding on the empty spool;

(d) repositioning said protective means to a frontal protective position in front of said first spool; and (e) providing outer operator protective means arranged to pivot to and from a frontal protection position in front of said first mentioned inner protective barrier means.

* * * * *